US012739007B2

(12) United States Patent
Lee et al.

(10) Patent No.: US 12,739,007 B2
(45) Date of Patent: Sep. 15, 2026

(54) MACHINE LEARNING-BASED VECTOR QUANTIZATION METHOD AND DEVICE FOR LIMITED FEEDBACK IN WIRELESS COMMUNICATION SYSTEM

(71) Applicant: Korea University Research and Business Foundation, Seoul (KR)

(72) Inventors: InKyu Lee, Seoul (KR); Jeonghyeon Jang, Seoul (KR)

(73) Assignee: Korea University Research and Business Foundation, Seoul (KR)

( * ) Notice: Subject to any disclaimer, the term of this patent is extended or adjusted under 35 U.S.C. 154(b) by 53 days.

(21) Appl. No.: 18/559,172

(22) PCT Filed: Dec. 14, 2021

(86) PCT No.: PCT/KR2021/018951
§ 371 (c)(1),
(2) Date: Nov. 6, 2023

(87) PCT Pub. No.: WO2022/234917
PCT Pub. Date: Nov. 10, 2022

(65) Prior Publication Data
US 2024/0235646 A1 Jul. 11, 2024

(30) Foreign Application Priority Data
May 6, 2021 (KR) ........................ 10-2021-0058709

(51) Int. Cl.
*H04B 7/06* (2006.01)
*H04B 7/0456* (2017.01)

(52) U.S. Cl.
CPC ......... *H04B 7/0663* (2013.01); *H04B 7/0456* (2013.01)

(58) Field of Classification Search
CPC ............................ H04B 7/0456; H04B 7/0663
(Continued)

(56) References Cited

U.S. PATENT DOCUMENTS 8,325,846 B2 12/2012 Ko et al.
2008/0165875 A1* 7/2008 Mundarath ............ H04B 7/086 375/262
2011/0310752 A1* 12/2011 Kim ..................... H04B 7/0645 370/252

FOREIGN PATENT DOCUMENTS

CN 107733482 A 2/2018
CN 109831399 * 5/2019
KR 10-2020-0062653 A 6/2020

OTHER PUBLICATIONS

Jang, Jeonghyeon, et al. "Deep learning-based limited feedback designs for MIMO systems." *IEEE Wireless Communications Letters* 9.4 (Dec. 19, 2019): pp. 558-561.

(Continued)

*Primary Examiner* — Leila Malek
(74) *Attorney, Agent, or Firm* — NSIP Law

(57) ABSTRACT

The present disclosure relates to a machine learning-based vector quantization method and device for limited feedback in a wireless communication system. The method for providing feedback on a selection vector by a reception terminal in a wireless communication system according to one embodiment of the present disclosure comprises the steps of: obtaining a feature matrix on the basis of a reception signal from a transmission terminal; obtaining a selection vector with respect to one or more codeword candidates included in a predetermined codebook, on the basis of the feature matrix; and sending feedback on the selection vector to the transmission terminal, wherein the selection vector comprises the same number of elements as the number of the one or more codeword candidates and may comprise one or more elements which are not 0.

9 Claims, 9 Drawing Sheets

(58) Field of Classification Search
USPC .......................................................... 375/260
See application file for complete search history.

(56) References Cited

OTHER PUBLICATIONS

Wen, Chao-Kal, Wan-Ting Shih, and Shi Jin. "Deep learning for massive MIMO CSI feedback." *IEEE Wireless Communications Letters* 7.5 (Apr. 23, 2018): pp. 748-751.
Jiang, Jing, et al. "Deep clustering-based codebook design for massive MIMO systems." *IEEE Access* 7 (Nov. 27, 2019): pp. 172654-172664.
Minsu Jeong, https://omicro03.medium.com/자연어처리-nlp-6일차-원-핫-인코딩-a8365009d380 (Jun. 8, 2019).
Office Action issued on Oct. 11, 2022, in in counterpart Korean Patent Application No. 10-2021-0058709 (6 pages of Korean).
Notice of Allowance issued on May 1, 2023, in counterpart Korean Patent Application No. 10-2021-0058709 (7 pages of Korean).

* cited by examiner

FIG.2
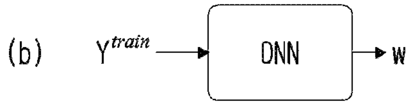

FIG.8

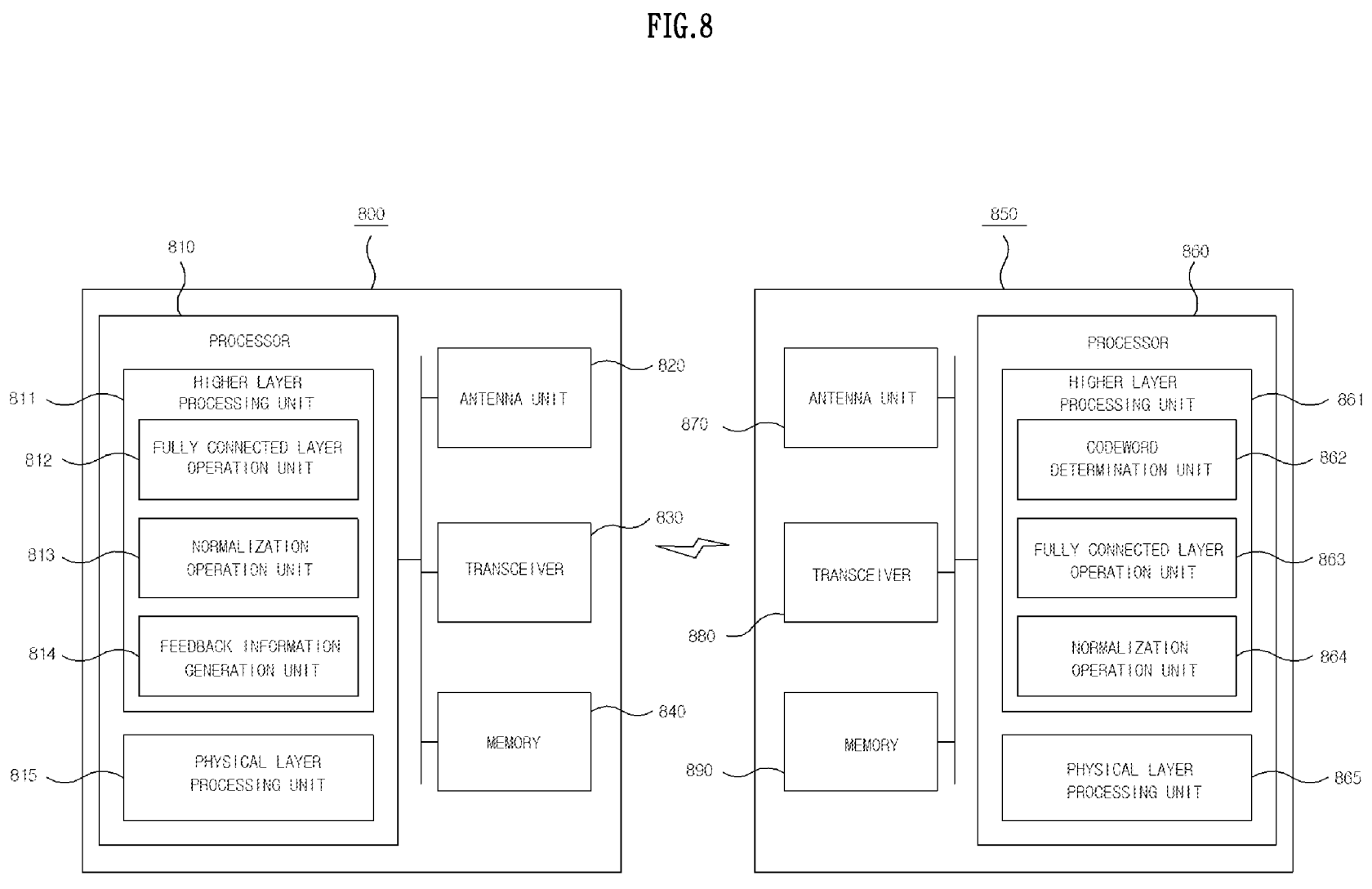

850
860 PROCESSOR
861 HIGHER LAYER PROCESSING UNIT
862 CODEWORD DETERMINATION UNIT
863 FULLY CONNECTED LAYER OPERATION UNIT
864 NORMALIZATION OPERATION UNIT
865 PHYSICAL LAYER PROCESSING UNIT
870 ANTENNA UNIT
880 TRANSCEIVER
890 MEMORY 800
810 PROCESSOR
811 HIGHER LAYER PROCESSING UNIT
812 FULLY CONNECTED LAYER OPERATION UNIT
813 NORMALIZATION OPERATION UNIT
814 FEEDBACK INFORMATION GENERATION UNIT
815 PHYSICAL LAYER PROCESSING UNIT
820 ANTENNA UNIT
830 TRANSCEIVER
840 MEMORY

MACHINE LEARNING-BASED VECTOR QUANTIZATION METHOD AND DEVICE FOR LIMITED FEEDBACK IN WIRELESS COMMUNICATION SYSTEM

CROSS REFERENCE TO RELATED APPLICATIONS

This application is a U.S. National Stage Application of International Application No. PCT/KR2021/018951, filed on Dec. 14, 2021, which claims the benefit under 35 USC 119(a) and 365(b) of Korean Patent Application No. 10-2021-0058709, filed on May 6, 2021, in the Korean Intellectual Property Office, the entire disclosure of which is incorporated herein by reference for all purposes.

TECHNICAL FIELD

The present disclosure relates to limited feedback in a wireless communication system, and more particularly, to a machine learning-based vector quantization method and device for limited feedback.

BACKGROUND ART

Communication systems employing multiple antennas or Multiple Input Multiple Output (MIMO) antennas are categorized into open loop and closed loop systems according to whether or not a receiver provides feedback to a transmitter. In the open loop system, the transmitter operates without information on a channel or channel status information (CSI) from the transmitter to the receiver. In the closed loop system, the transmitter operates with the CSI acquired from the receiver in consideration.

In the closed loop system, the CSI fed back by the receiver includes beamforming (or precoding) information (for example, precoding matrix index (PMI)). The beamforming means that a transmission stream to be transmitted by the transmitter is mapped to multiple antennas (or an antenna port). This mapping relationship is expressed by a beamforming matrix (or vector). The transmitter performs beamforming with reference to beamforming information fed back by the receiver.

The limited feedback refers to a feedback scheme in which the beamforming information to be fed back is limited to a range of sets of beamforming matrices that are shared between the transmitter and the receiver. A predefined set that is made up of one or more beamforming matrices is referred to as a codebook. One codebook includes one or more codewords. Each codeword corresponds to one beamforming matrix. That is, a feedback scheme using the codebook is referred to as limited feedback.

In a feedback scheme in the related art, the codebook is designed on the assumption that the receiver precisely secures the channel information. In addition, codebook design which applies quantization to codewords included in a codebook by using machine learning (e.g., deep learning) is being discussed. However, since there is no way to prevent quantization loss in codebook design, there is a problem that codewords included in a codebook cannot guarantee the optimal feedback performance.

DISCLOSURE

Technical Problem

A technical problem of the present disclosure is to provide a method and a device for machine learning-based vector quantization in codebook design for limited feedback in a wireless communication system.

An additional technical problem of the present disclosure is to provide a method and a device for preventing quantization loss of vector quantization based on machine learning in codebook design for limited feedback in wireless communication system.

An additional technical problem of the present disclosure is to provide a method and a device for improving feedback performance by using a codebook designed based on a vector quantization technique in a wireless communication system.

An additional technical problem of the present disclosure is to provide a method and a device for improving system gain and communication quality by using a codebook designed based on a vector quantization technique in a wireless communication system.

Technical problems that the present disclosure attempted to solve are not limited to the technical problems described above. From the legend "DETAILED DESCRIPTION OF THE INVENTION", it would be apparent to a person of ordinary skill in the art that there are other technical problems that are not mentioned.

Technical Solution

A method of giving feedback on a selection vector by a receiver in a wireless communication system according to an aspect of the present disclosure includes obtaining a feature matrix based on a reception signal from a transmitter; based on the feature matrix, obtaining a selection vector for at least one codeword candidate included in a predetermined codebook; and giving feedback on the selection vector to the transmitter, and the selection vector is configured with the same number of elements as the number of the at least one codeword candidate and may include at least one non-zero element.

A method of determining a precoder by a transmitter in a wireless communication system according to an additional aspect of the present disclosure includes receiving at least one selection vector from a receiver; otaining at least one codeword by using the at least one selection vector; and determining a precoder based on the at least one codeword, and each of the at least one selection vector is configured with the same number of elements as the number of at least one codeword candidate included in a predetermined codebook and may include at least one non-zero element.

A receiving device of performing feedback in a wireless communication system according to an additional aspect of the present disclosure includes a transceiver; an antenna unit; a memory; and a processor, and the processor is configured to acquire and store in the memory a feature matrix based on a reception signal received from the transmitter through the transceiver and stored in the memory; based on the feature matrix, obtain and store in the memory a selection vector for at least one codeword candidate included in a predetermined codebook; and give feedback on the selection vector to the transmitter through the transceiver, and the selection vector is configured with the same number of elements as the number of the at least one codeword candidate and may include at least one non-zero element.

A transmitting device of determining a precoder in a wireless communication system according to an additional aspect of the present disclosure includes a transceiver; an antenna unit; a memory; and a processor, and the processor is configured to receive and store in the memory at least one selection vector from a receiver through the transceiver; obtain and store in the memory at least one codeword by using the at least one section vector; and determine a precoder based on the at least one codeword, and each of the at least one selection vector is configured with the same number of elements as the number of at least one codeword candidate included in a predetermined codebook and may include at least one non-zero element.

Features of the present invention, which are summarized above, are only exemplary aspects of the present disclosure and do not impose any limitation on the scope of the present disclosure.

Technical Effects

According to the present disclosure, a method and a device for machine learning-based vector quantization in codebook design for limited feedback in a wireless communication system may be provided.

According to the present disclosure, a method and a device for preventing quantization loss of vector quantization based on machine learning in codebook design for limited feedback in wireless communication system may be provided.

According to the present disclosure, a method and a device for improving feedback performance by using a codebook designed based on a vector quantization technique in a wireless communication system may be provided.

According to the present disclosure, a method and a device for improving system gain and communication quality by using a codebook designed based on a vector quantization technique in a wireless communication system may be provided.

Advantages that are to be achieved according to the present disclosure are not limited to those described above. From the legend "DETAILED DESCRIPTION OF THE INVENTION", it would be apparent to a person of ordinary skill in the art that there are advantages that are not mentioned.

BRIEF DESCRIPTION OF THE DRAWINGS

FIG. 2 is a diagram illustrating a codebook design scheme in which the present disclosure finds application.

FIG. 8 is a diagram illustrating the respective configurations of a reception device and a transmission device according to the present disclosure.

BEST MODE

Figure 1:
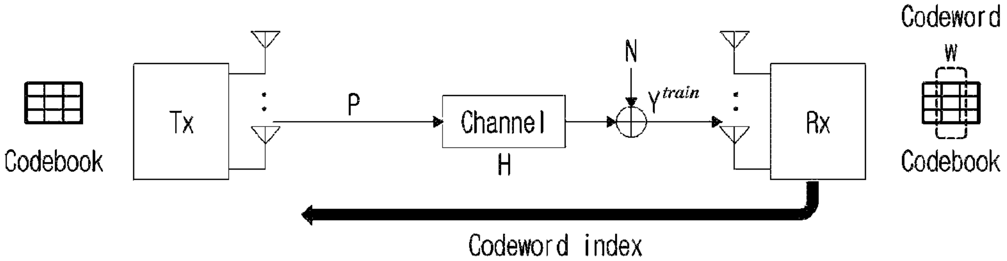
FIG. 1 is a diagram illustrating a limited-feedback system in which the present disclosure finds application.

Embodiments of the present disclosure will be described in detail below with reference to the accompanying drawings in such a manner that a person of ordinary skill in the art to which the present disclosure pertains is enabled to practice them without undue experimentation. However, the present disclosure can be implemented by modification, substitution, improvement, and the like and is not limited to the embodiments that will be described below.

When describing the embodiments of the present disclosure, in a case where detailed descriptions of configurations or functions known in the related art are determined to make the nature and gist of the present disclosure indefinite, the detailed descriptions thereof are omitted. Elements that do not relate to the description of the present disclosure are omitted from the drawings, and like elements are given like reference characters.

In the present disclosure, when a constituent element is referred to as being "connected to", being "combined with", and having "access to" one other constituent element, this means that the constituent element may be directly connected to one other constituent element or may be "indirectly connected to one other constituent with an intervening constituent element in between. When the expression "include a constituent element" or "have a constituent element" is used, unless otherwise described, this expression means "further include at least one other constituent element, not "exclude any other constituent element".

In the present disclosure, the terms "first", "second", and so on are used to distinguish one constituent element from another constituent element, and unless otherwise described, no limitation is imposed on the order of constituent elements or the importance of each constituent element. Therefore, a first constituent element according to an embodiment within the scope of the present disclosure may be referred to as a second constituent element according to another embodiment. Similarly, a second constituent element according to an embodiment may be referred to as a first constituent element according to another embodiment.

In the present disclosure, the use of the terms "first", "second", and so on serves to definitely describe features of each of the distinguishable constituent elements and does not mean that constituent elements are necessarily separated from each other. That is, multiple constituent elements may be integrated into one piece of hardware or one piece of software, and one constituent element may be separated into multiple pieces of hardware or multiple pieces of software. Therefore, although not specifically mentioned, an embodiment resulting from the integration or an embodiment resulting from the separation falls within the scope of the present disclosure.

In the present disclosure, constituent elements according to various embodiments are not necessarily intended to be essential constituent elements, and one or several thereof may be selected. Therefore, another embodiment including constituent elements, selected from among constituent elements that are described below and which constitute an embodiment, also falls within the scope of the present disclosure. In addition, an embodiment, which results from adding one or more constituent elements to constituent elements that constitute various embodiments described below, also falls within the scope of the present disclosure.

The present disclosure relates to communication between network nodes in a wireless communication system. Network nodes include at least one of the following: a base station, a terminal, or a relay. The term base station (BS) is used interchangeably with the terms fixed station, Node B, eNodeB (eNB), ng-eNB, gNodeB (gNB), access point (AP), and so on. The term terminal is used interchangeably with the terms user equipment (UE), mobile station (MS), mobile subscriber station (MSS), subscriber station (SS), non-AP station (non-AP STA), and so on.

The wireless communication system may support communication between a base station and a terminal or may support inter-terminal communication. Downlink (DL) in the communication between the base station and the terminal refers to communication from the base station to the terminal. Uplink (UL) refers to communication from the terminal to the base station. For the inter-terminal communication, various communication schemes or services are used, such as device-to-device (D2D), vehicle-to-everything (V2X), a proximity service (ProSe), and sidelink communication. Terminals for the inter-terminal communication include a sensor node, a vehicle, a disaster alarm, and so on.

In addition, a wireless communication system includes a relay and a relay node (RN). In a case where a relay finds application in the communication between the base station and the terminal, the relay serves as a base station communicating with a terminal and also serves as a terminal communicating with a base station. On the other hand, in a case where the relay finds application in the inter-terminal communication, the relay serves as a base station communicating with each of the terminals.

The present disclosure finds application in various multi-access schemes for the wireless communication system. Examples of the multi-access scheme include Code Division Multiple Access (CDMA), Time Division Multiple Access (TDMA), Frequency Division Multiple Access (FDMA), Orthogonal Frequency Division Multiple Access (OFDMA), Single Carrier-FDMA (SC-FDMA), OFDM-FDMA, OFDM-TDMA, OFDM-CDMA, Non-Orthogonal Multiple Access (NOMA), and so on. In addition, a wireless communication system in which the present disclosure finds application may support a Time Division Duplex (TDD) scheme that uses the respective distinctive time resources for uplink communication unit and downlink communication and may support a Frequency Division Duplex (FDD) scheme that uses the respective distinctive frequency resources for uplink communication and downlink communication.

According to the present disclosure, the expression "transmit or receive a channel" has the meaning of "transmit or receive information or a signal over a channel". For example, the expression "transmit a control channel" has the meaning of "transmit control information or a control signal over a control channel". Similarly, the expression "transmit data channel" has the meaning of "transmit data information or a data signal over a data channel".

In order to utilize the advantages of multiple antennas in a multi-antenna communication system, it is essential to share channel information representing information on an environment between a transmitter and a receiver. For this purpose, a method of giving feedback on channel information at a receiver by using a signal received from a transmitter may be used. In particular, research on a limited feedback technique utilizing a limited frequency band is continuously conducted. For limited feedback, a concept of a predefined codebook is used between a transmitter and a receiver. Accordingly, quality of feedback may be determined depending on how well this codebook is designed. For example, in codebook design for a single user, a codebook design technique for a case in which there is no correlation between antennas used at a transmitter and a receiver or for a general case is studied.

Recently, a method of utilizing a machine learning (e.g., deep learning) technology in codebook design is discussed. Deep learning is typically conducted by training based on a gradient descent method. However, since a gradient of quantization, an essential element in codebook design, is not defined, a solution therefor is required to apply a deep learning technology. For example, a quantization technique based on a binarization technique was discussed, and specifically, it may be designed to enable training by a training method using an estimated approximate value, not a direct gradient, by adding any noise to a simple binarization function. However, there is a problem that quantization loss occurs in codebook design due to a limited expression of quantized output and a fact that optimality of a quantization technique is not proven. Accordingly, in determining codebook design, i.e., codewords included in a codebook, a new method for reducing quantization loss is required.

Hereinafter, in codebook design for limited feedback in a wireless communication system, embodiments of the present disclosure for a vector quantization method based on machine learning are described.

FIG. 1 is a diagram illustrating a limited-feedback system in which the present disclosure finds application.

In a multi-antenna communication system (or a MIMO antenna system), information relating to a channel between a transmitter and a receiver needs to be shared to take advantage of multiple antennas. To this end, the receiver determines channel information using a signal received from the transmitter and then feeds the determined channel information back to the transmitter.

As an amount of feedback information increase, the resource available for user data transmission becomes insufficient. This requires a method of reducing feedback information overhead. For example, a feedback scheme utilizing a limited frequency bandwidth may be applied, and a limited-feedback scheme using a codebook may is applied.

In the wireless communication system employing the limited-feedback scheme, the transmitter Tx and the receiver Rx share a predefined codebook. In this case, the transmitter transmits pilot signal (or reference signal) P to the receiver through Nt antennas. The pilot signal P corresponds to a signal in a predefined pattern or sequence, which is shared between the transmitter and the receiver. It is assumed that the pilot signal has a length of L.

The pilot signal is transmitted by the transmitter over channel H. Then the pilot signal to which noise N is added during the transmission over channel H is received by the receiver through Nr antennas. Channel estimation is performed on channel H using $Y^{train}$ that results from a pattern of the pilot signal known in advance to the receiver changing due to channel H and noise N.

The receiver selects codeword w from a codebook on the basis of the estimated channel information. At this point, the receiver selects a codeword with which an effective channel gain is maximized. For example, based on estimated channel information, a codeword which minimizes a chordal distance or maximizes an ergodic capacity may be selected.

The receiver transfers information or a codeword index indicating the selected codeword w to the transmitter over a feedback channel. The transmitter determines a codeword corresponding to the codeword index fed back by the receiver from a codebook and performs transmission on the basis of the determined codeword. However, the transmitter only refers to the information fed back by the receiver and is not necessarily required to exactly comply with the information fed back by the receiver.

FIG. 2 is a diagram illustrating a codebook design scheme in which the present disclosure finds application.

As illustrated in (a) of FIG. 2, in a limited-feedback system in the related art, channel estimation is performed using signal $Y^{train}$ received by a receiver, a codeword is selected on the basis of a channel estimated by the receiver, and the selected codeword is fed back to a transmitter. In addition, the transmitter performs beamforming on the basis of the feedback information from the receiver and accordingly determines suitable beamforming matrix (or vector) w. The beamforming matrix that is determined in this manner is used as a codeword to be included in a codebook.

In the limited-feedback system in the related art, there is a limitation in that, because each process is divided into blocks on the assumption of a linear system, a relationship between input $Y^{train}$ (that is, a reception signal) and output w (that is, a codeword) is difficult to derive.

In the limited-feedback system based on a machine learning, which is illustrated in (b) of FIG. 2, an entire process is analogous to a single black box. For example, the black box is expressed as a deep neural network algorithm. Accordingly, a direct nonlinear relationship between input $Y^{train}$ (that is, a reception signal) and output W (that is, a codeword) is derived.

According to the present disclosure, it is assumed that the transmitter includes Nt (Nt is an integer that is equal to greater than 2) antennas and that the receiver includes Nr (Nt is an integer that is equal to or greater than 2) antennas. In addition, it is assumed that, using an FDD scheme, the transmitter transmits information and the receiver receives information. However, these assumptions are only for clear description and do not impose any limitation on the scope of the present disclosure. The principle behind the present disclosure also applies, in the same manner, in a case where the transmitter or the receiver includes one or more antennas and in a system that supports the TDD schem.

In the wireless communication system with this configuration, in order to derive beamforming matrix or precoder matrix W that is to be applied according to channel H (here, $H\in C^{N_r\times N_t}$), a signal at the receiver receiving data information from the transmitter, is expressed as in Equation 1.

$$y^{data} = \sqrt{E_s}Hs + n^{data} \quad \text{[Equation 1]}$$

where $y^{data}$ denotes a reception signal of data information, Es denotes a transmission power of the data information, H denotes a channel, s denotes a transmission signal and $n^{data}$ denotes noise.

Transmitted signal s is defined as a product of beamforming matrix W (here, $W\varepsilon C^{N_t\times N_r}$) and data information x to be transmitted (i.e., s=Wx). Hereinafter, a method of effectively obtaining beamforming matrix W is described.

Figure 3:
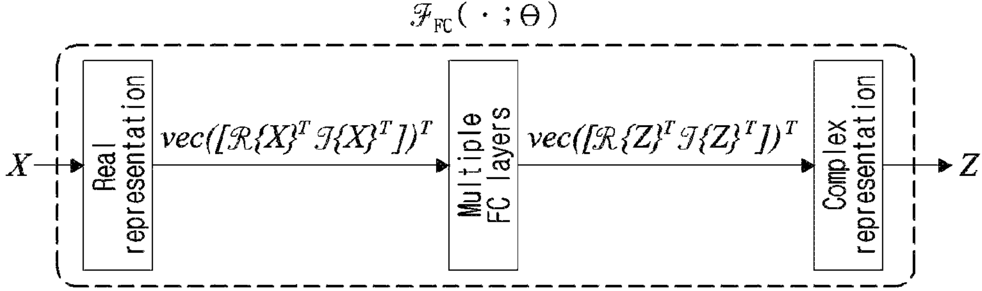
FIG. 3 is a diagram for describing a structure of a fully-connected deep neural network to which the present disclosure may be applied.

FIG. 3 is a diagram for describing a structure of a fully-connected deep neural network to which the present disclosure may be applied.

A deep neural network (DNN) model, as an example of the machine learning technique, finds application in the present disclosure. However, the scope of the disclosure is not limited to the DNN model, and the principle behind the present disclosure may apply to a similar machine learning technique.

The DNN model is created, on the basis of a human neural network, in the computer science field, and is a model that is made up of various layers that serve as human neurons. A middle layer other than input and output layers is referred to as a hidden layer, and an output of m-th hidden layer is expressed as in Equation 2.

$$x_m = a_m(W_m x_{m-1} + o_m) \quad \text{[Equation 2]}$$

where $x_m$ denotes an output of an m-th layer, $a_m$ denotes an activation function, $W_m$ denotes a weighting factor, and $o_m$ denotes a bias. That is, the output of the m-th layer is expressed as an output of the activation function of which an input is a value that is obtained by adding a bias of the m-th layer to a result of applying a weighting factor of the m-th layer to an output of an (m−1)-th layer.

A nonlinear relationship between an input and an output, which is difficult to express mathematically, is approximated using the DNN model that includes various layers and various nonlinear activation functions, and a problem that is difficult to solve theoretically can be solved accordingly.

An example in FIG. 3 shows that input complex matrix X obtains output value Z by passing through a fully connected layer neural network configured with a total of L layers and an operation for it may be referred to as $\mathcal{F}_{FC}(\bullet)$. In order to use complex matrix X as input in a neural network, transform to a real vector (real representation) is required as in $x=\text{vec}([\Re\{X\}^T \mathcal{J}\{X\}^T])^T$. When input passes through a neural network, output of a l-th hidden layer may be expressed as in Equation 3.

$$z = a_L(\Phi_L( \ldots (\Phi_2 a_1(\Phi_1 x + b_1) + b_2) \ldots ) + b_L \quad \text{[Equation 3]}$$

Here, $\Phi_l$ refers to a weight of a l-th hidden layer and bi represents a bias of a l-th hidden layer. $a_l$ refers to a nonlinear activation function. When output which passed through all layers is referred to as z̃, an output complex matrix may be calculated as in $z=\text{vec}([\Re\{Z\}^T\Im\{Z\}^T])^T$. Output Z may be obtained through complex representation for output of a fully-connected layer.

When all weights and biases configuring a neural network including a fully connected layer are referred to as $\theta=\{\Phi_l, b_l\forall l\}$, the overall mapping relationship between input X, operation $\mathcal{F}_{FC}(\bullet)$ and output Z may be expressed as in Equation 4 below.

$$Z = \mathcal{F}_{FC}(X;\theta) \quad \text{[Equation 4]}$$

Figure 4:
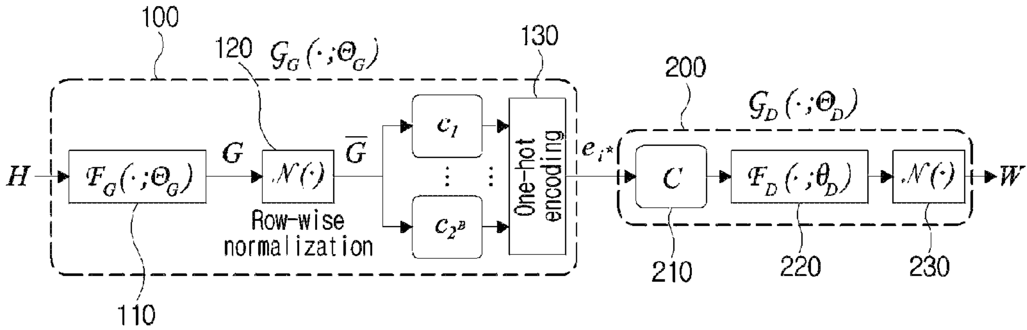
FIG. 4 is a diagram for describing machine learning-based vector quantization according to an embodiment of the present disclosure.

FIG. 4 is a diagram for describing machine learning-based vector quantization according to an embodiment of the present disclosure.

A fully connected DNN structure described by referring to FIG. 3 may be applied to each of a receiver 100 and a transmitter 200 of a codebook design system as in an example of FIG. 4. For example, a codebook design system may include a fully connected DNN operation structure which applies channel information H from a transmitter 200 to a receiver 100 as input of a receiver 100 to output vector $e_{i*}$ and a fully connected DNN operation structure which receives vector $e_{i*}$ as input from a transmitter 200 to finally output beamforming matrix (or precoder) W.

For clarity of a description, a case in which input of a codebook design system is channel information H is taken as an example, but a scope of the present disclosure is not limited thereto, and even when signal y received through channel H is used as input, examples of codebook design that machine learning-based vector quantization is applied may be equally applied. In other words, in examples below, input H may include channel information and/or reception signal information at a receiver 100.

A DNN structure-based codebook design system may be broadly divided into two operation sections. A first operation structure may correspond to a quantization section at a receiver 100 and a second operation structure may correspond to a decoding section at a transmitter 200.

All operations in a quantization section are defined as $\mathcal{G}_G(\bullet;\Theta_G)$ and $\theta_G$ may refer to deep neural network parameters included in an operation of a quantization section.

All operations in a decoding section are defined as $\mathcal{G}_D(\bullet;\Theta_D)$ and $\theta_D$ may refer to deep neural network parameters included in an operation of a decoding section.

When input H passes through a fully connected layer 110 defined as $\mathcal{F}_G(*\bullet;\theta_G)$, feature matrix G may be obtained. For feature matrix G, when a row-wise normalization operation 120 defined as $\mathcal{N}(\bullet)$ is performed, normalized feature matrix $\overline{G}\in\mathbb{C}^{N_r\times N_t}$ may be obtained. Here, normalization may include a process of modifying each row of a feature matrix to be positioned in a vector space of a codeword. For example, each row of feature matrix G may be normalized to a single norm to perform normalization to make it equal to a norm of a codeword.

Based on normalized feature matrix $\overline{G}$, quantization may be performed through codeword selection. For example, when the number of bits of codewords included in codebook matrix C is referred to as B, a codebook matrix configured with $2^B$ unit vector codewords (or single norm codewords $c_1$, $c_2$, . . . , $c_{2^n}$) called $C\in\mathbb{C}^{N_t\times 2^B}$ may be treated as a deep neural network parameter and a codeword which satisfies a condition in Equation 5 may be selected.

$$i^* = \underset{j=1,\ldots,2^B}{\arg\max}\left\|\overline{G}c_j\right\|^2 \qquad \text{[Equation 5]}$$

Here, $c_j\in\mathbb{C}^{N_t}$ ($j=1, \ldots, 2^B$) refers to a j-th codeword, i.e., a j-th column of codebook matrix C. In other words, among $2^B$ codewords ($c_1$, $c_2$, . . . , $c_{2^B}$), a codeword (i*) with the highest effective channel gain with $\overline{G}$ may be selected.

Here, quantization through codeword selection may cause a gradient vanishing problem. Therefore, it is impossible to include a quantization operation as it is in deep neural network training. In order to solve this problem, a one-hot vector may be modified or an approximate value of a one-hot vector may be applied to codeword selection.

In other words in order to prevent a gradient vanishing problem of quantization through codeword selection, relaxation for quantization may be applied in the present disclosure. For example, in the present disclosure, a relaxed quantization result may be obtained through a one-hot encoding 130 operation that a one-hot vector is modified.

Specifically, a one-hot vector corresponds to a vector which selects one of multiple candidates, and for example, elements of a one-hot vector may be expressed like [0, 0, . . . , 1, 0, 0, . . . , 0]. In other words, $2^B$ elements configuring a vector of a $2^B$ length may be configured with 1 1 and $2^B-1$ 0s.

In contrast, a selection vector for relaxed quantization according to the present disclosure (e.g., it may be referred to as a modified one-hot vector or an approximate value of a one-hot vector to distinguish from an existing one-hot vector) may be expressed as $e_{i*}$. Elements of selection vector $e_{i*}$may be configured with at least one non-zero element. In addition, when there are a plurality of non-zero elements of selection vector $e_{i*}$, some or all of their values may be the same or different. For example, selection vector $e_{i*}$ may be configured like [0, 0.4, 0.2, 0, . . . , 0].

In other words, a selection vector for relaxed quantization according to the present disclosure may be said to select one codeword corresponding to a weight-based combination of at least one codeword, instead of selecting only any one of candidates (e.g., $2^B$ codewords 130). In other words, one codeword selected by a selection vector in the present disclosure may correspond to any one of codeword candidates or may correspond to one codeword corresponding to a combination of at least two codeword candidates (i.e., a new codeword codeword which does not belong to codeword candidates). For example, when selection vector $e_{i*}$ includes two non-zero elements like [0, 0.4, 0.2, 0, . . . , 0], among codeword candidates $c_1$, $c_2$, . . . , $c_{2^B}$, one new codeword may be specified which corresponds to a combination of $c_2$ and $c_3$ and a combination that weight 0.4 for $c_2$ is applied and weight 0.2 for $c_2$ is applied.

A selection vector (or an approximate value of a one-hot vector) described above may be configured as in Equation 6.

$$e_{i^*} \rightarrow \left[e_{i^*,1}, \ldots, e_{i^*,2^H}\right] \qquad \text{[Equation 6]}$$

$e_{i*,l}$, a l-th element of selection vector $e_{i*}$, may be expressed as in Equation 7.

$$e_{i^*,l} = \frac{\left\|\overline{G}\ c_l\right\|^\alpha}{\sum_{j=1}^{2^B}\left\|\overline{G}\ c_j\right\|^\alpha} \qquad \text{[Equation 7]}$$

Here, α corresponds to an approximation degree variable. In other words, an approximation degree is adjusted by α, and as that value goes to infinity, it may converge to an existing one-hot vector (i.e., a vector that only one of $2^B$ elements of a selection vector has a value of 1 and the remaining $2^B-1$ elements have a value of 0). Accordingly, in order to prevent a gradient vanishing problem in a quantization process, a deep neural network may be trained after designating a value of α as a predetermined positive real number.

Next, precoder matrix W may be calculated through a decoding section of a transmitter 200 by using selection vector $e_{i*}$obtained through a quantization section of a receiver 100.

An operation 210 which multiplies selection vector $e_{i*}$input to a transmitter 200 by codebook matrix C may be performed. It may have the same meaning as obtaining a selected codeword in a quantization section. In other words, a product of selection vector $e_{i*}$ and codebook matrix C corresponds to specific codeword $c_{i*}$, and although a receiver 100 transmits only $e_{i*}$, not $c_{i*}$ to a transmitter 200, a transmitter 200 may easily obtain $c_{i*}$.

Afterwards, feature matrix G' may be obtained (or reconstructed) from codeword $c_{i*}$by passing through a fully connected layer 220 defined as $\mathcal{F}_D(\cdot;\theta_D)$. For example, element g' of a form included in feature matrix G' may be obtained based on one codeword $c_{i*}$. For example, one element g' included in feature matrix G' may correspond to one row of feature matrix G'. In addition, element g' of a form included in feature matrix G', an output value of a fully connected layer 210 of a transmitter 200, may have the same form as element g of feature matrix G obtained through a fully connected layer 110 of a receiver 100, but g' and g may be distinguished. In other words, it may be said that element g included in feature matrix G represents some features of input H and g' included in feature matrix G' represents a feature reconstructed based on codeword $c_{i*}$derived by a selection vector, output of a quantization section.

Here, in an operation of a fully connected layer 210, a one-hot vector, not a selection vector (or a modified one-hot vector or an approximate value of a one-hot vector), may be used as it is. In other words, a selection vector of the present disclosure is a means for a gradient in a quantization section and is used only for deep neural network training.

Precoder W may be finally calculated through row-wise normalization 230 for feature matrix G'. Normalization may include a process of modifying each row of a feature matrix to positioned in a vector space of a codeword. In other words, normalization may be performed to reconstruct a shape of $\overline{G}'$.

In other words, output precoder W may have the same shape as element $\overline{g}'$ of a form included in normalized feature matrix $\overline{G}'$, and in the present disclosure, an output value of a decoding section may be used as precoder W as it is.

A codebook may be configured with at least one set of precoder W derived in this way. For example, for $e_{i*}$_1, input of a decoding section, $c_{i*}$_1 is output through a codebook product operation 210, g'_1 is output through a fully connected layer operation 220 for input of $c_{i*}$_1 and $\overline{g}'$_1 is output through a normalization operation 230 for input of g'_1, and accordingly, precoder W_1 may be determined. In addition, $c_{i*}$_2 is output through a codebook product operation 210 for $e_{i*}$_2, other input of a decoding section, g'_2 is output through a fully connected layer operation 220 for input of $c_{i*}$_2 and $\overline{g}'$_2 is output through a normalization operation 230 for input of g'_2, and accordingly, precoder W_2 may be determined. As such, in a decoding section, for at least one input $e_{i*}$_1, $e_{i*}$_2, . . . , at least one output W_1, W 2, . . . may be obtained, and a set of at least one output value W_1, W_2, . . . may be configured in a form of a final codebook.

A deep neural network described by referring to an example in FIG. 4 may be trained as follows.

Training of a deep neural network may be performed based on a gradient descent method. It may be said to be a method of descending after calculating a gradient of each parameter for loss function $\mathcal{L}$ which evaluates performance of a precoder. When all parameters configuring a deep neural network are referred to as $\theta=\{\theta_G, \theta_D\}$, gradient descent may be expressed as in Equation 8.

$$\Theta \leftarrow \Theta - \eta\nabla_{\Theta}\mathcal{L} \quad \text{[Equation 8]}$$

Here, η refers to a descent rate. Parameters θ may be updated by repeating Equation 8 until a value of loss function $\mathcal{L}$ converges.

In other words, training of a deep neural network may be completed by updating all parameters θ in a quantization section of a receiver 100 and a decoding section of a transmitter 200 in a codebook design system by using a gradient descent method. It may update a weight and a bias parameter of a fully connected layer of the entire system to determine a DNN parameter of an optimal codebook design system.

In addition, codebook C may be updated through separate loss function $\mathcal{R}$. Loss function $\mathcal{R}$ may be defined as in Equation 9.

$$\mathcal{R} = -\|\overline{G}c_{i^*}\|^2 \quad \text{[Equation 9]}$$

Codebook C may be also updated by using a gradient descent method. In other words, as codewords included in a codebook (i.e., codeword candidates subject to application of selection vector $e_{i*}$) are updated through loss function $\mathcal{R}$, a codebook including optimal codewords may be determined.

Parameters may be updated by repeating two processes above until a value of a loss function converges.

A process of updating parameter θ for the entire system of a deep neural network described above (e.g., Equation 8) may be performed in connection with a process of updating codebook C (e.g., Equation 9). For example, a process of updating all system parameters and a process of updating a codebook may be performed alternately. For example, after a process of updating a parameter is performed a predetermined number of repetitions and the entire system parameter θ_1 is determined, a process of updating a codebook may be performed a predetermined number of repetitions based on θ_1 and codebook C_1 may be determined. Subsequently, after a process of updating a parameter is performed a predetermined number of repetitions based on C_1 and the entire system parameter θ_2 is determined, a process of updating a codebook may be performed a predetermined number of repetitions based on θ_2 and codebook C_2 may be determined. By repeating this process, the optimal parameter θ and the optimal codebook C may be finally determined.

Figure 5:
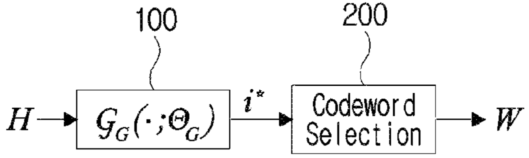
FIG. 5 is a diagram for describing a limited feedback operation according to an embodiment of the present disclosure.

FIG. 5 is a diagram for describing a limited feedback operation according to an embodiment of the present disclosure.

A receiver 100 and a transmitter 200 of FIG. 5 assume that a deep neural network parameter that training/update described by referring to FIG. 4 is completed is configured a codebook that training/update is completed is shared.

A receiver 100 may perform quantization from input H (i.e., a reception signal and/or a channel value) through a deep neural network $\mathcal{G}_G(\cdot;\Theta_G)$ and output index i* of an optimal codeword. A standard for codeword selection may follow Equation 5 described above. Here, index i* may correspond to specific one of codewords in a codebook.

Index i* may be fed back to a transmitter 200. A transmitter 200 may select optimal codeword W from codebook C based on index i* fed back. A transmitter 200 may transmit a signal to a receiver 100 by applying beamforming/precoding based on selected codeword W.

In other words, when signal transmission or reception is performed based on a deep neural network that training for codebook design is completed, a receiver 100 may give feedback on only codeword index i* to a transmitter 200 and a transmitter 200 may derive a specific codeword indicated by i*. Here, a selection vector (e.g., a modified one-hot vector or an approximate value of a one-hot vector described above) is not required in an execution structure after training is completed.

Figure 6:
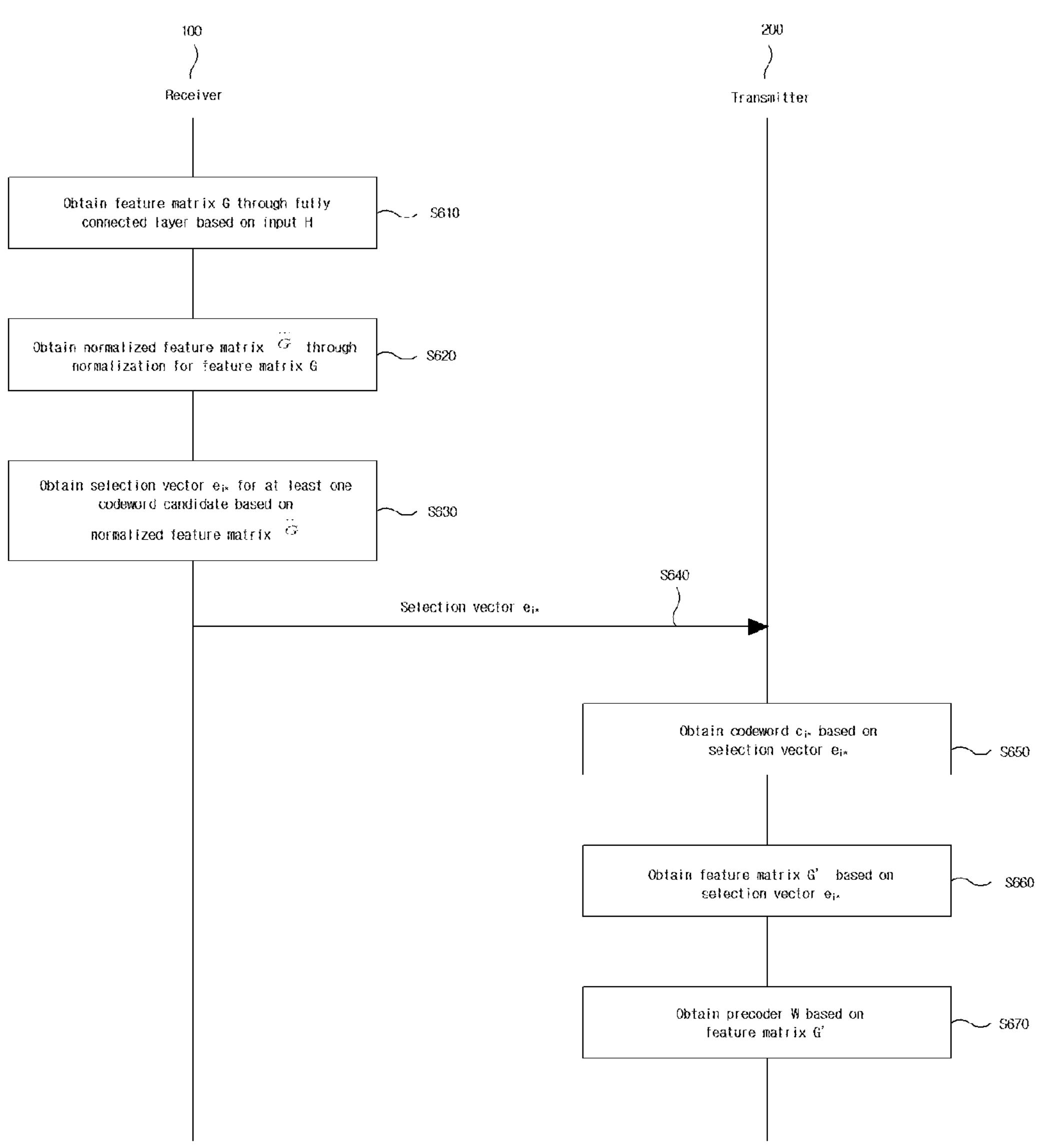
FIG. 6 is a diagram for describing a machine learning-based vector quantization method according to the present disclosure.

FIG. 6 is a diagram for describing a machine learning-based vector quantization method according to the present disclosure.

In S610, a receiver 100 may obtain feature matrix G through a fully connected layer (e.g., $\mathcal{F}_G(\bullet;\theta_G)$) based on input H (e.g., a reception signal and/or channel information). For a detailed operation, a description for a fully connected layer operation 110 of FIG. 4 may be applied.

In S620, a receiver 100 may obtain normalized feature matrix $\overline{G}$ through normalization (e.g., row-wise normalization) for feature matrix G. For a detailed operation, a description for a normalization operation 120 of FIG. 4 may be applied.

In S630, a receiver 100 may obtain selection vector $e_{i*}$ for at least one codeword candidate based on normalized feature matrix $\overline{G}$. For a detailed operation, a description for a one-hot encoding operation 130 of FIG. 4 may be applied.

In S640, a receiver 100 may transmit/give feedback on selection vector $e_{i*}$ to a transmitter 200.

In S650, a transmitter 200 may obtain codeword $c_{i*}$ based on selection vector $e_{i*}$. For a detailed operation, a description for a product operation 210 of selection vector $e_{i*}$ and codebook C in FIG. 4 may be applied.

In S660, a transmitter 200 may obtain feature matrix G' through a fully connected layer (e.g., $\mathcal{F}_D(\bullet;\theta_D)$) based on codeword $c_{i*}$. For a detailed operation, a description for a fully connected layer operation 220 of FIG. 4 may be applied.

In S670, a transmitter 200 may obtain precoder W through normalization (e.g., row-wise normalization) for feature matrix G'. For a detailed operation, a description for a normalization operation 230 of FIG. 4 may be applied.

Figure 7:
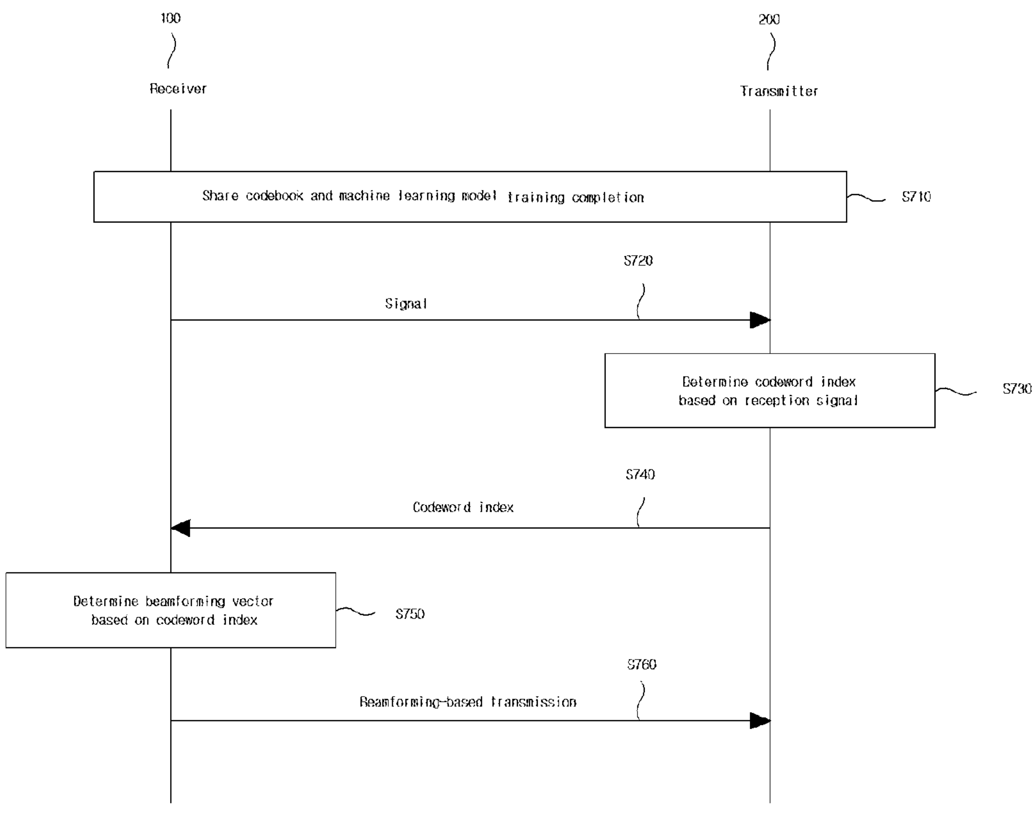
FIG. 7 is a flowchart for describing a method of performing limited feedback based on a codebook designed according to the present disclosure.

FIG. 7 is a flowchart illustrating a method of performing limited feedback on the basis of the codebook designed according to the present disclosure.

In S710, a transmitter and a receiver may share a codebook and machine-learning model training completion.

For example, as described by referring to FIGS. 4 and 6, a receiver 100 may calculate codeword selection vector $e_{i*}$ from input of reception signal H (e.g., including channel information) and give feedback on it to a transmitter 200. A transmitter 200 may determine precoder W based on feedback information $e_{i*}$.

This process is iterated and thus neural network training is performed. When the neural network training is completed, receiver parameter $\theta_G$ and transmitter parameter $\theta_D$ are determined. In addition, codewords included in codebook C may be updated and an updated codebook may be shared between a receiver 100 and a transmitter 200.

Here, deep neural network training and codebook optimization in S710 may be performed in an offline process. In other words, Step S710 (or an operation in FIGS. 4 and 6) may be performed in an arrangement step before actual signal transmission or reception between a transmitter 200 and a receiver 100 is performed. When this offline process is completed and a deep neural network parameter and a codebook are predetermined, the following operation (or an operation in FIG. 5) may be performed based on a corresponding parameter and codebook. In a situation where the codebook or the neural network parameter is predetermined in this manner, the receiver performs limited feedback, and the transmitter performs beamforming-based transmission on the basis of the feedback information.

Therefore, when completing the neural network training and then applying the limited-feedback system (or during an online process) the computational complexity in a neural network training process may not be considered.

In Step S720, a transmitter transmits a signal (e.g., a pilot signal and/or data information) to a receiver.

In Step S730, a receiver determines a codeword index based on a signal received from a transmitter (i.e., a pilot/data information signal through a channel). For example, a receiver 100 generates codeword index i* according to an operation described with reference to FIG. 5. In other words, when completing a neural network training and then applying a limited-feedback system, a receiver 100 may perform a neural network operation again (e.g., performs a fully connected layer operation 110 and a normalization operation 120 in FIG. 4, but selects one optimal codeword of codeword candidates instead of one-hot encoding 130) to determine codeword index i*.

In Step S740, a receiver transfers a codeword index to a transmitter.

In Step S750, a transmitter determines a beamforming vector based on a codeword index received from a receiver.

For example, a transmitter may simply select a beamforming vector (or a precoder) based on an index fed back from a receiver, instead of performing a neural network operation again as in FIG. 4. For example, a transmitter may configure a lookup table based on a one-to-one mapping relationship between a codeword index and a beamforming vector.

Therefore, when completing the neural network training and then applying the limited-feedback system, the neural network computation is not needed in the transmitter. Therefore, when applying the limited-feedback system, the computational complexity in the transmitter may not be considered.

In Step S760, the transmitter performs the beamforming-based transmission.

For example, the transmitter may use the beamforming vector determined in Step S750 on the basis of the feedback information, without any change thereto, but may determine a different beamforming vector as an optimal beamforming vector. The transmitter applies the beamforming vector determined in this manner, for transmission to the receiver.

As the present disclosure is a codebook design method based on a vector quantization technique utilized in an existing communication system, it may contribute to improving implementation gain and communication quality in a frequency division duplexing (FDD) transmission system which should utilize a limited frequency band.

According to examples of the present disclosure described above, an optimal codebook may be derived by applying vector quantization based on machine learning to prevent quantization loss or gradient loss. In addition, examples of the present disclosure may derive not only a precoder from a reception signal, but also channel information. In particular, examples of the present disclosure may obtain improved quantization performance by supporting a higher degree of freedom in quantization expression compared to a binarization structure which should get a specific value. Particularly, in the examples of the present disclosure, the complexity in implementation of the FDD system in which a limited frequency bandwidth is required to be utilized is reduced, and the communication quality is improved.

FIG. 8 is a diagram illustrating the respective configurations of a reception device and a transmission device according to the present disclosure.

The reception device 800 includes a processor 810, an antenna unit 820, a transceiver 830, and a memory 840.

The processor 810 performs signal processing associated with a baseband and includes a higher layer processing unit 811 and a physical layer processing unit 815. The higher layer processing unit 811 performs processing associated with a MAC layer, an RRC layer, and a layer higher than these layers. The physical layer processing unit 815 performs processing (for example, transmission/reception signal processing and the like over uplink/downlink/sidelink) associated with a PHY layer. In addition to performing the signal processing associated with the baseband, the processor 810 may control overall operation of the reception device 800.

The antenna unit 820 includes one or more physical antennas and, when including multiple antennas, supports MIMO transmission and reception. The transceiver 830 includes an RF transmitter and an RF receiver. The memory 840 stores information that results from computation by the processor 810, and software, an operating system, an application, and the like, which are associated with operation of the reception device 800. The memory 590 may include a constituent element such as a buffer.

The processor 810 of the reception device 800 causes the receiver according to the embodiments of the present disclosure to operate.

For example, a higher layer processing unit 811 of a processor 810 of a reception device 800 may include a fully connected layer operation unit 812, a normalization operation unit 813 and a feedback information generation unit 814.

A processor 810 may generate input H based on a signal received through an antenna unit 820 and a transceiver 830. Input H may include a reception signal and/or channel information and may be stored in a memory 840.

A fully connected layer operation unit 812 may output feature matrix G based on input H. A normalization operation unit 813 may output normalized feature matrix $\overline{G}$ based on feature matrix G.

A feedback information generation unit 814 may output selection vector $e_{i*}$based on a normalized feature matrix and codeword candidates ($c_1, c_2, \ldots, c_{2^B}$) in a codebook in an offline process. Here, selection vector $e_{i*}$may have at least one non-zero element and may indicate one codeword (not included in a codebook) corresponding to a weight-based combination of at least one of codeword candidates.

A feedback information generation unit 814 may generate codeword index information indicating specific one of codeword candidates in a codebook based on a normalized feature matrix in an online process.

The processor 810 performs transmission processing (for example, coding, channel coding, physical resource mapping, transmission signal generation, and the like) on the feedback information through the physical layer processing unit 815, and transmits the feedback information to the transmission device 850 through the transceiver 830.

The transmission device 850 includes a processor 860, an antenna unit 870, a transceiver 880, and a memory 890.

The processor 860 performs signal processing associated with a baseband and includes a higher layer processing unit 861 and a physical layer processing unit 865. The higher layer processing unit 861 performs processing associated with a MAC layer, an RRC layer, and a layer higher than these layers. The physical layer processing unit 865 performs processing (for example, transmission/reception signal processing and the like over uplink/downlink/sidelink) associated with a PHY layer. In addition to performing the signal processing associated with the baseband, the processor 860 may control overall operation of the transmission device 860.

The antenna unit 870 includes one or more physical antennas and, when including multiple antennas, supports MIMO transmission and reception. The transceiver 880 includes an RF transmitter and an RF receiver. The memory 890 stores information that results from computation by the processor 860, and software, an operating system, an application, and the like, which are associated with operation of the transmission device 850. The memory 590 may include a constituent element such as a buffer.

The processor 860 of the transmission device 850 causes the transmitter according to the embodiments of the present disclosure to operate.

For example, a higher layer processing unit 861 of a processor 860 of a transmitting device 850 may include a codeword determination unit 862, a fully connected layer operation unit 863 and a normalization operation unit 864.

The processor 860 transmits a signal to the reception device 800 through the transceiver 880 and the antenna unit 870.

The processor 860 receives the feedback information from the reception device 800 through the transceiver 880. The received feedback information is stored in the memory 890.

A codeword determination unit 862 may determine a codeword based on feedback information. For example, in an offline process, a codeword determination unit 862 may determine one codeword (not included in a codebook) corresponding to a weight-based combination of at least one of codeword candidates in a codebook based on selection vector $e_{i*}$. Alternatively, in an online process, a codeword determination unit 862 may determine specific one of codeword candidates in a codebook based on a codeword index and apply beamforming for a signal transmitted from a transmitter to a receiver in reference to a determined codeword.

A fully connected layer operation unit 863 and a normalization operation unit 864 may operate in an offline process. A fully connected layer operation unit 863 may output feature matrix G' based on at least one codeword determined by at least one selection vector. A normalization operation unit 864 may output $\overline{G}'$ based on feature matrix G'. Feature matrix $\overline{G}'$ reconstructed in this way may be output as precoder W and may be applied to neural network training and codebook update.

In a case where the reception device 800 and the transmission device 850 are the same in operation as the receiver 100 and the transmitter 200, respectively, which are described in the examples of the present disclosure, descriptions thereof are omitted.

Figure 9:
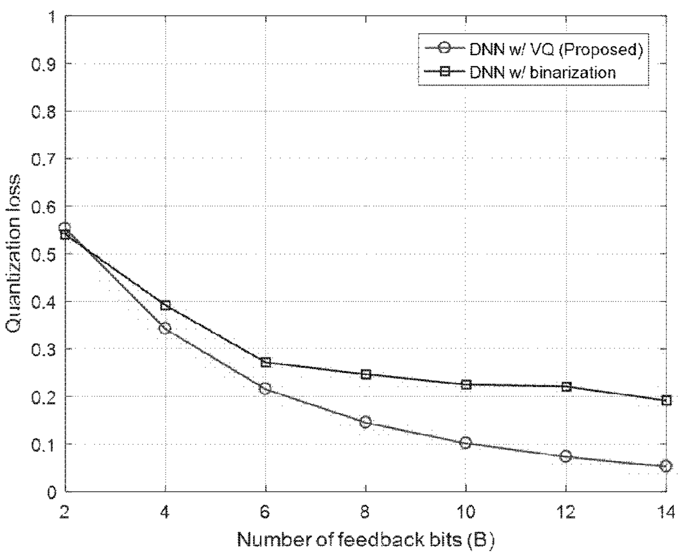
FIG. 9 is a diagram illustrating the result of simulating the limited-feedback system according to the present disclosure.

FIG. 9 is a diagram illustrating the result of simulating the limited-feedback system according to the present disclosure.

An example of FIG. 9 shows quantization loss according to a change in the number of feedback bits in a multi-antenna system. Here, it was assumed that the number of antennas at a transmitter was 4 ($N_t$=4) and the number of antennas at a receiver was 1 ($N_r$=1). A channel model used a channel with a rayleigh fading feature and used $\mathcal{L}$ defined in Equation 10 as a loss function used for neural network training and an index representing quantization loss.

$$\mathcal{L} = \frac{1}{N_r}\|\overline{H}\overline{H}^H - WW^H\|_2^2 \quad \text{[Equation 10]}$$

Here, $\overline{H}$ refers to an optimal precoder matrix and may be obtained by extracting $N_r$ right singular vectors from values obtained through a SVD operation of channel H. Equation 10 is closely related to an element which determines the transmission amount (capacity, C) of a system in Equation 11.

$$C = \log_2 \det\left(I + \frac{E_s}{\sigma_n^2} W^H H^H H W\right) \quad \text{[Equation 11]}$$

In an example of FIG. 9, DNN w/ VQ (proposed) is a simulation result according to a deep neural network-based vector quantization (VQ) technique according to an example of the present disclosure and DNN w/ binarization to be compared is a simulation result according to a binarization technique. As the number of feedback bits increases, the loss of a method according to the present disclosure decreases, so it may be confirmed that quantization performance is improved compared to a comparison target.

Exemplary methods according to the present disclosure are described as a sequence of operations for clear description, but this is not intended to impose any limitation on the order in which steps are performed. If necessary, the steps may be performed simultaneously or in a different order. In order to implement the method according to the present disclosure, one or several other steps may be included in addition to the steps described above. Alternatively, one or several of the steps described above may be omitted. Alternatively, one or several of the steps described above may be omitted, and one or several other steps may be included.

The various embodiments of the present disclosure, which are described above, do not include all possible combinations of the constituent elements and are provided only for descriptions of representative aspects of the present disclosure. The constituent elements described according to the various embodiments may be applied independently or in combination.

In addition, the various embodiments of the present disclosure can be implemented in firmware, in software, or with a combination of these. The various embodiment can be implemented by at least one of the following: Application Specific Integrated Circuits (ASICs), Digital Signal Processors (DSPs), Digital Signal Processing Devices (DSPDs), Programmable Logic Devices (PLDs), Field Programmable Gate Arrays (FPGAs), general processors, controllers, micro controllers, microprocessors, and the like.

The scope of the present disclosure includes software or machine-executable commands (for example, an operating system, an application, firmware, a program, and the like) that cause a device or a computer to perform the methods according to the various embodiments, and a non-transitory computer-readable medium on which the software or the commands are recorded in a manner that is executable on the device or the computer.

INDUSTRIAL AVAILABILITY

Examples of the present disclosure may be applied to a limited feedback method in a variety of wireless communication systems.

The invention claimed is:

1. A method of giving feedback on a selection vector by a receiver in a wireless communication system, the method comprising:

receiving, by the receiver, a signal from a transmitter;

obtaining, through a fully connected layer of a deep neural network at the receiver, a feature matrix based on the signal received from the transmitter;

based on the feature matrix, obtaining, by the receiver, the selection vector for at least one codeword candidate included in a predetermined codebook; and transmitting, by the receiver, feedback information including the selection vector to the transmitter, wherein the selection vector is configured with a same number of elements as the number of the at least one codeword candidate and includes at least one non-zero element, wherein the selection vector specifies a weight-based combination for at least one of the at least one codeword candidate, wherein the selection vector is obtained based on a normalized feature matrix, wherein the normalized feature matrix is obtained by applying normalization to the feature matrix, wherein $e_{i^*,l}$ which is an l-th element of the selection vector $e_{i^*}$ is expressed as in Equation below:

$$e_{i^*,l} = \frac{\|\overline{G}\, c_l\|^\alpha}{\sum_{j=1}^{2^B}\|\overline{G}\, c_j\|^\alpha}$$

where, $\overline{G}$ is the normalized feature matrix, $c_x$ is a x-th codeword of the at least one codeword candidate, $2^B$ corresponds to the number of the at least one codeword candidate, $\alpha$ is a predetermined positive real number.

2. The method of claim 1, wherein:

the normalization is row-wise normalization.

3. The method of claim 1, wherein:

the signal received from the transmitter includes channel information.

4. A method of determining a precoder by a transmitter in a wireless communication system, the method comprising:

transmitting, by the transmitter, a signal to a receiver;

receiving, by the transmitter from the receiver, feedback information including at least one selection vector;

obtaining, by the transmitter, at least one codeword candidate by using the at least one selection vector;

obtaining, through a fully connected layer of a deep neural network at the transmitter, a feature matrix based on the at least one codeword candidate; and determining, by the transmitter, the precoder based on the feature matrix, wherein the at least one selection vector is configured with a same number of elements as the number of the at least one codeword candidate included in a predetermined codebook and includes at least one non-zero element, wherein the at least one selection vector specifies a weight-based combination for at least one of the at least one codeword candidate, wherein the at least one selection vector is obtained based on a normalized feature matrix, wherein the normalized feature matrix is obtained by applying normalization to the feature matrix, wherein $e_{i^*,l}$ which is an l-th element of the at least one selection vector $e_{i^*}$ is expressed as in Equation below:

$$e_{i^\star,l} = \frac{\|\overline{G}c_l\|^\alpha}{\sum_{j=1}^{2^B}\|\overline{G}c_j\|^\alpha}$$

where, $\overline{G}$ is the normalized feature matrix, $c_x$ is a x-th codeword of the at least one codeword candidate, $2^B$ corresponds to the number of the at least one codeword candidate, α is a predetermined positive real number.

5. The method of claim 4, wherein:

each of the at least one codeword candidates is obtained by a product of the at least one selection vector and the predetermined codebook.

6. The method of claim 4, wherein:

the precoder is obtained based on the normalized feature matrix.

7. The method of claim 6, wherein:

the normalization is row-wise normalization.

8. A receiving device performing feedback in a wireless communication, the receiving device comprising:

a transceiver;

an antenna unit;

a memory; and a processor, wherein the processor is configured to:

receive, through the transceiver, a signal from a transmitting device, obtain and store in the memory a feature matrix, through a fully connected layer of a deep neural network at the receiving device, based on the signal received from the transmitting device through the transceiver and stored in the memory;

based on the feature matrix, obtain and store in the memory a selection vector for at least one codeword candidate included in a predetermined codebook; and transmit feedback information including the selection vector to the transmitting device through the transceiver, wherein the selection vector is configured with a same number of elements as the number of the at least one codeword candidate and includes at least one non-zero element, wherein the selection vector specifies a weight-based combination for at least one of the at least one codeword candidate, wherein the selection vector is obtained based on a normalized feature matrix, wherein the normalized feature matrix is obtained by applying normalization to the feature matrix, wherein $e_{i^*,l}$ which is an l-th element of the selection vector $e_{i^*}$ is expressed as in Equation below:

$$e_{i^\star,l} = \frac{\|\overline{G}c_l\|^\alpha}{\sum_{j=1}^{2^B}\|\overline{G}c_j\|^\alpha}$$

where, $\overline{G}$ is the normalized feature matrix, $c_x$ is a x-th codeword of the at least one codeword candidate, $2^B$ corresponds to the number of the at least one codeword candidate, α is a predetermined positive real number.

9. A transmitting device determining a precoder in a wireless communication system, the transmitting device comprising:

a transceiver;

an antenna unit;

a memory; and a processor, wherein the processor is configured to:

transmit, through the transceiver, a signal to a receiving device;

receive and store in the memory feedback information including at least one selection vector from the receiving device through the transceiver;

obtain and store in the memory at least one codeword candidate by using the at least one section vector;

obtain and store in the memory, through a fully connected layer of a deep neural network at the transmitting device, a feature matrix based on the at least one codeword candidate; and determine the precoder based on the feature matrix, wherein the at least one selection vector is configured with a same number of elements as the number of the at least one codeword candidate included in a predetermined codebook and includes at least one non-zero element, wherein the at least one selection vector specifies a weight-based combination for at least one of the at least one codeword candidate, wherein the at least one selection vector is obtained based on a normalized feature matrix, wherein the normalized feature matrix is obtained by applying normalization to the feature matrix, wherein $e_{i^*,l}$ which is an l-th element of the at least one selection vector $e_{i^*}$ is expressed as in Equation below:

$$e_{i^\star,l} = \frac{\|\overline{G}c_l\|^\alpha}{\sum_{j=1}^{2^B}\|\overline{G}c_j\|^\alpha}$$

where, $\overline{G}$ is the normalized feature matrix, $c_x$ is a x-th codeword of the at least one codeword candidate, $2^B$ corresponds to the number of the at least one codeword candidate, α is a predetermined positive real number.

* * * * *